(12) United States Patent
Engström et al.

(10) Patent No.: US 11,006,338 B2
(45) Date of Patent: May 11, 2021

(54) UE, FIRST AND SECOND RADIO CONTROL NODE (RCN), AND METHODS THEREIN FOR ADAPTING A PROCESS OF CHANGING RADIO CONNECTIONS

(71) Applicant: Telefonaktiebolaget LM Ericsson (publ), Stockholm (SE)

(72) Inventors: Stefan Engström, Linköping (SE); Daniel Henriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/490,533

(22) PCT Filed: Mar. 8, 2017

(86) PCT No.: PCT/SE2017/050225
§ 371 (c)(1),
(2) Date: Aug. 31, 2019

(87) PCT Pub. No.: WO2018/164615
PCT Pub. Date: Sep. 13, 2018

(65) Prior Publication Data
US 2020/0128459 A1    Apr. 23, 2020

(51) Int. Cl.
*H04W 36/10*    (2009.01)
*H04W 16/28*    (2009.01)
(Continued)

(52) U.S. Cl.
CPC ........... *H04W 36/10* (2013.01); *H04W 16/28* (2013.01); *H04W 36/0083* (2013.01);
(Continued)

(58) Field of Classification Search
CPC ..... H04W 36/10; H04W 36/30; H04W 16/28; H04W 36/00837; H04W 36/0083; Y02D 30/70
(Continued)

(56) References Cited

U.S. PATENT DOCUMENTS 9,414,430 B2    8/2016    Vajapeyam et al.
2009/0298502 A1*  12/2009   Hagerman ............ H04W 36/30
                                                   455/436
2013/0072199 A1*  3/2013    Miyagawa ............ H04W 36/10
                                                   455/438

FOREIGN PATENT DOCUMENTS

WO    2013170209 A1    11/2013
WO    2014022021 A1    2/2014

OTHER PUBLICATIONS

International Search Report and Written Opinion of Application No. PCT/SE2017/050225, dated Dec. 8, 2017, 15 pages.
(Continued)

*Primary Examiner* — Michael Y Mapa
(74) *Attorney, Agent, or Firm* — NDWE LLP

(57) ABSTRACT

A method performed by a first Radio Control Node (RCN) for handling a radio connection to be established in a second beam controlled by a second RCN for the UE served in a first beam controlled by the first RCN. When the radio connection of the UE, served in a first beam controlled by the first RCN, has been established in the second beam controlled by a second RCN, the first RCN obtains feedback from the second RCN. The feedback relates to information about the characteristics of the radio connection in the second beam resulting from measurements performed when the radio connection has been established between the UE and a second radio node providing the second beam. The first RCN then provides for the radio connection to be estab-
(Continued)

501. Obtain information about expected characteristics of the second beem.

502. Arrange for establishment of radio connection of the UE in the second beam controlled by the second RCN.

503. Obtain from second RCN, feedback relating characteristics of radio connection in second beam resulting from measurements performed when the radio connection has been established.

504. Determine a coverage overlap of the first beam and the second beam based on obtained feedback from the second RCN.

505. Adapt process for radio connections to be established in second beam controlled by second RCN for UEs served in the first beam controlled by the first RCN based on the obtained feedback.

Method performed in first RCN 111 lished in the second beam controlled by the second RCN for any UEs served in the first beam.

24 Claims, 15 Drawing Sheets

(51) Int. Cl.
*H04W 36/30* (2009.01)
*H04W 36/00* (2009.01)
(52) U.S. Cl.
CPC ...... *H04W 36/30* (2013.01); *H04W 36/00837* (2018.08); *Y02D 30/70* (2020.08)
(58) Field of Classification Search
USPC ............................... 455/435.1–445; 370/331
See application file for complete search history.

(56) References Cited

OTHER PUBLICATIONS

International Preliminary Report on Patentability of Application No. PCT/SE2017/050225, dated Sep. 19, 2019, 7 pages.
3GPP TS 36.423, "3rd Generation Partnership Project; Technical Specification Group Radio Access Network; Evolved Universal Terrestrial Radio Access Network (E-UTRAN); X2 application protocol (X2AP) (Release 14)," Sep. 2016, 239 pages, V14.0.0, 3GPP Organizational Partners.
Communication pursuant to Article 94(3) EPC for EP Application No. 17713484.8, dated Oct. 7, 2020, 5 pages.

\* cited by examiner

Fig. 5 Method performed in first RCN 111

Fig. 6 Method performed in second RCN 112

Fig. 7 Method performed in UE 120

UE, FIRST AND SECOND RADIO CONTROL NODE (RCN), AND METHODS THEREIN FOR ADAPTING A PROCESS OF CHANGING RADIO CONNECTIONS

CROSS-REFERENCE TO RELATED APPLICATIONS

This application is a National stage of International Application No. PCT/SE2017/050225, filed Mar. 8, 2017, which is hereby incorporated by reference.

TECHNICAL FIELD

Embodiments herein relate to a first Radio Control Node (RCN) and methods therein. In particular, they relate to adapting a process of changing radio connections for User Equipments (UEs) from a first beam controlled by the first RCN to a second beam controlled by a second RCN.

Embodiments herein further relate to a User Equipment (UE), a second RCN and methods therein. In particular, these further embodiments relate to assisting the first RCN in adapting the process of changing radio connections for UEs from a first beam controlled by the first RCN to a second beam controlled by the second RCN.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a WI-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

As mentioned above, the 3GPP is currently working on standardization of the 5th generation of radio access system, which also is referred to as New Radio (NR). An evolved architecture for the RAN is foreseen, both for LTE Evolution and New Radio tracks of 5G. This includes a solution where radio base stations may be split into parts for radio control, packet processing, and Radio Nodes (RNs) with base-band processing and radio units. An example of the new architecture is shown in FIG. 1, indicating possible interfaces. A Radio Control Function (RCF) is in this example included in a Radio Control Node (RCN).

The following is presented in an NR context but may be valid also in other radio access networks.

The NR is connected to some network that provides non-access stratum functions and connection to communication networks outside NR, like the internet. This is here shown as a core network as specified by 3GPP.

Beamforming

One important property in NR is beamforming in both directions, meaning that transmissions between an RN and a UE may be done using narrow beams to for example improve the signal to noise ratio and thereby improve the bit rate.

One consequence of beamforming may be that one specific UE could be within the coverage of many different RNs at the same time. This means that the network can choose which RN that shall serve the UE when it is in a location that has overlapping beams since it can be served from one or the other RN. The problem with this is that there may be a lot of handovers of the UE to different RNs to optimize the channel quality for the UE, whereof some handovers are unnecessary and may give a handover ping-pong effect.

SUMMARY

It is therefore an object of embodiments herein to provide a more efficient method to control changing of radio connections for UEs between different beams in a wireless communication network.

According to a first aspect of embodiments herein, the object is achieved by a method performed by a first Radio Control Node, RCN, for handling radio connections to be established in a second beam controlled by a second RCN for UEs served in a first beam controlled by the first RCN. When a radio connection of a UE served in a first beam controlled by the first RCN has been established in the second beam controlled by a second RCN, the first RCN obtains feedback from the second RCN. The feedback relates to information about the characteristics of a radio connection in the second beam resulting from measurements performed when the radio connection has been established between the UE and a second radio node providing the second beam. The first Radio Control Node, RCN then adapts a process for radio connections to be established in the second beam controlled by the second RCN for UEs served in the first beam controlled by the first RCN based on the obtained feedback.

According to a second aspect of embodiments herein, the object is achieved by a method performed by a second Radio Control Node, RCN, for assisting a first RCN in handling radio connections to be established in a second beam controlled by a second RCN for User Equipments, UEs, served in a first beam controlled by the first RCN.

when a radio connection of the UE served in the first beam controlled by the first RCN has been established in the second beam controlled by the second RCN, the second RCN obtains measurements relating to information about the characteristics of a radio connection in the second beam. The measurements result from measurements performed when the radio connection has been established between the UE and a second radio node providing the second beam. The second RCN then sends feedback to the first RCN. The feedback relates to information about the characteristics of a radio connection in the second beam based on the obtained measurements, thereby assisting the first RCN in adapting the process for radio connections to be established in the second beam controlled by the second RCN for UEs served in the first beam controlled by the first RCN based on the obtained feedback.

According to a third aspect of embodiments herein, the object is achieved by a method performed by a User Equipment, UE, for assisting a first Radio Control Node RCN in adapting a process of changing radio connections for User Equipments, UEs, from a first beam controlled by the first RCN to a second beam controlled by a second RCN. When a radio connection of a UE served in a first beam controlled by the first RCN has been established in the second beam controlled by a second RCN, the UE obtains measurements relating to information about the characteristics of a radio connection in the second beam. The measurements result from measurements performed when the radio connection has been established between the UE and a second radio node providing the second beam. The UE then sends feedback to the first RCN via the second RCN. The feedback relates to information about the characteristics of a radio connection in the second beam based on the obtained measurements. The UE thereby assists the first RCN in adapting the process for radio connections to be established in the second beam controlled by the second RCN for UEs served in the first beam controlled by the first RCN based on the obtained feedback.

According to a fourth aspect of embodiments herein, the object is achieved by a first Radio Control Node, RCN, for handling radio connections to be established in a second beam controlled by a second RCN for UEs served in a first beam controlled by the first RCN. The first RCN is configured to, when a radio connection of a UE served in a first beam controlled by the first RCN has been established in the second beam controlled by a second RCN, obtain feedback from the second RCN. The feedback is adapted to relate to information about the characteristics of a radio connection in the second beam resulting from measurements performed when the radio connection has been established between the UE and a second radio node providing the second beam. The first RCN is further configured to adapt a process for radio connections to be established in the second beam controlled by the second RCN for UEs served in the first beam controlled by the first RCN based on the obtained feedback.

According to a fifth aspect of embodiments herein, the object is achieved by a second Radio Control Node, RCN, for assisting a first RCN handling radio connections to be established in a second beam controlled by a second RCN for User Equipments, UEs, served in a first beam controlled by the first RCN. The second RCN is configured to when a radio connection of the UE served in the first beam controlled by the first RCN has been established in the second beam controlled by the second RCN 112, obtain measurements relating to information about the characteristics of a radio connection in the second beam. The measurements result from measurements performed when the radio connection has been established between the UE and a second radio node providing the second beam.

The second RCN is further configured to send feedback to the first RCN. The feedback is adapted to relate to information about the characteristics of a radio connection in the second beam based on the obtained measurements. The second RCN is thereby assists the first RCN in adapting the process for radio connections to be established in the second beam controlled by the second RCN for UEs served in the first beam controlled by the first RCN based on the obtained feedback.

According to a sixth aspect of embodiments herein, the object is achieved by a User Equipment, UE, for assisting a first Radio Control Node RCN in adapting a process of changing radio connections for User Equipments, UEs, from a first beam controlled by the first RCN to a second beam controlled by a second RCN.

The UE is configured to, when a radio connection of a UE served in a first beam controlled by the first RCN has been established in the second beam controlled by a second RCN, obtain measurements relating to information about the characteristics of a radio connection in the second beam resulting from measurements performed when the radio connection has been established between the UE and a second radio node providing the second beam. The UE is further configured to send feedback to the first RCN via the second RCN. The feedback is adapted to relate to information about the characteristics of a radio connection in the second beam based on the obtained measurements, thereby assisting the first RCN in adapting the process for radio connections to be established in the second beam controlled by the second RCN for UEs served in the first beam controlled by the first RCN based on the obtained feedback.

To overcome that broadcasted signals measured before establishing a new radio connection do not give full knowledge about characteristics of a radio connection in the second beam from a neighbor node such as the second RCN, embodiments herein measure and send feedback related to information about the characteristics of a radio connection in the second beam resulting from measurements performed when the radio connection has been established between the UE and a second radio node providing the second beam. In this way the first RCN can, based on the obtained feedback, adapt the process for radio connections to be established in the second beam controlled by the second RCN for UEs served in the first beam controlled by the first RCN. This results in an efficient method to control changing of radio connections for UEs between different beams in a wireless communication network.

An advantage of embodiments herein is that the first RCN serving the UE before establishing the new radio connection in the second beam obtains feedback relating to characteristics of the radio connection in the second beam such as e.g. knowledge about the coverage of the neighbour node such as the second RCN when the radio connection in the second beam is established, and thereby can adapt the process for radio connections to be established in the second beam controlled by the second RCN for UEs served in the first beam controlled by the first RCN to improve the mobility functionality. For example, the feedback received about characteristics of the radio connection such as radio channel etc. in the neighbour node, can, together with stored information about the UEs radio channel, data delays, energy consumption and ongoing services in the old RN, be used to take a better decision on when to move a UE to the neighbour RN such as from the first beam to the second beam. E.g. signal power and quality in the new serving RN can be compared with the last registered signal quality from the source RN and thereby it may for example be determined if a handover shall be initiated earlier.

BRIEF DESCRIPTION OF THE DRAWINGS

Examples of embodiments herein are described in more detail with reference to attached drawings in which.

DETAILED DESCRIPTION

As part of developing embodiments herein a problem will first be identified and discussed.

Figure 1:
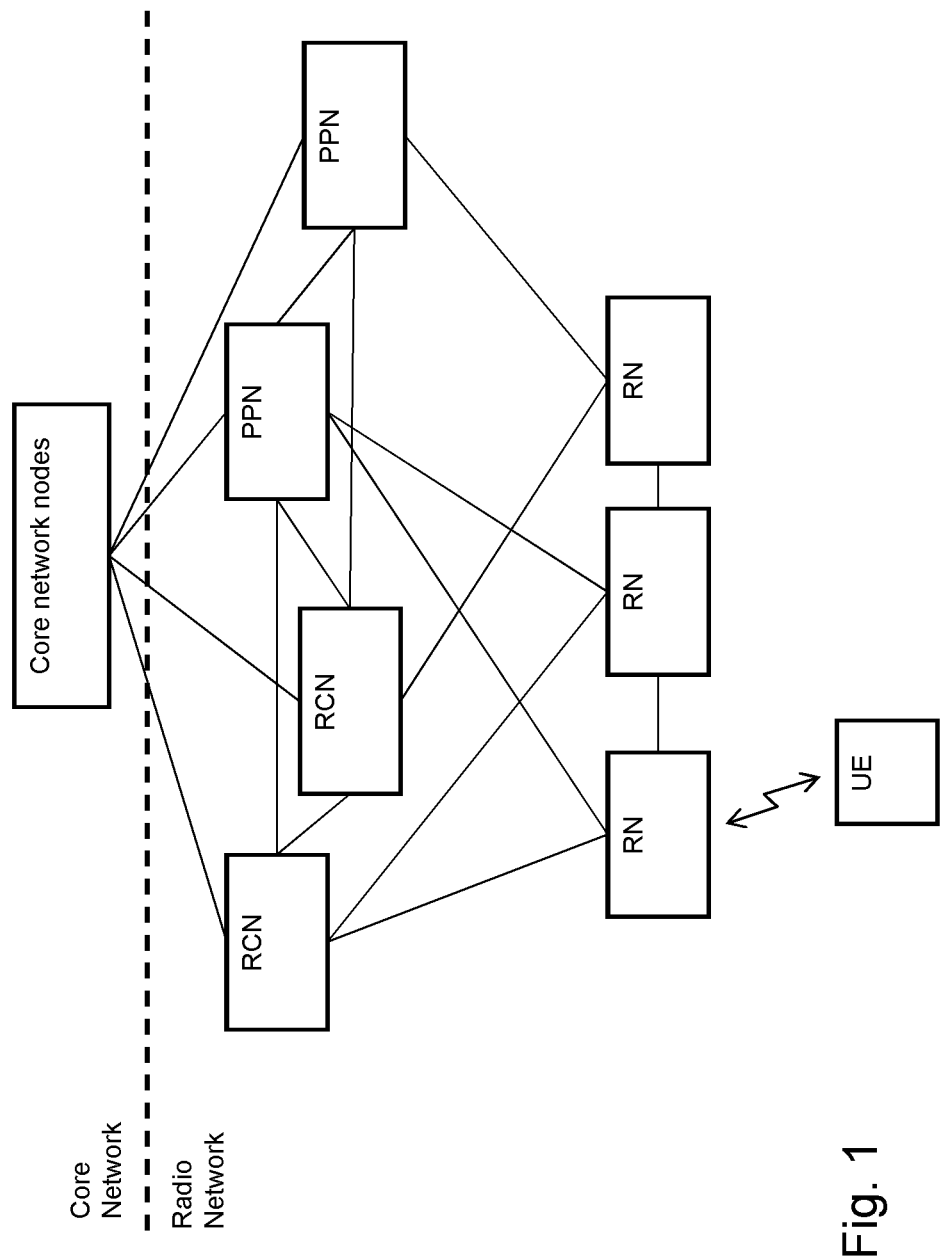
FIG. 1 is a schematic block diagram illustrating prior art.
Figure 2:
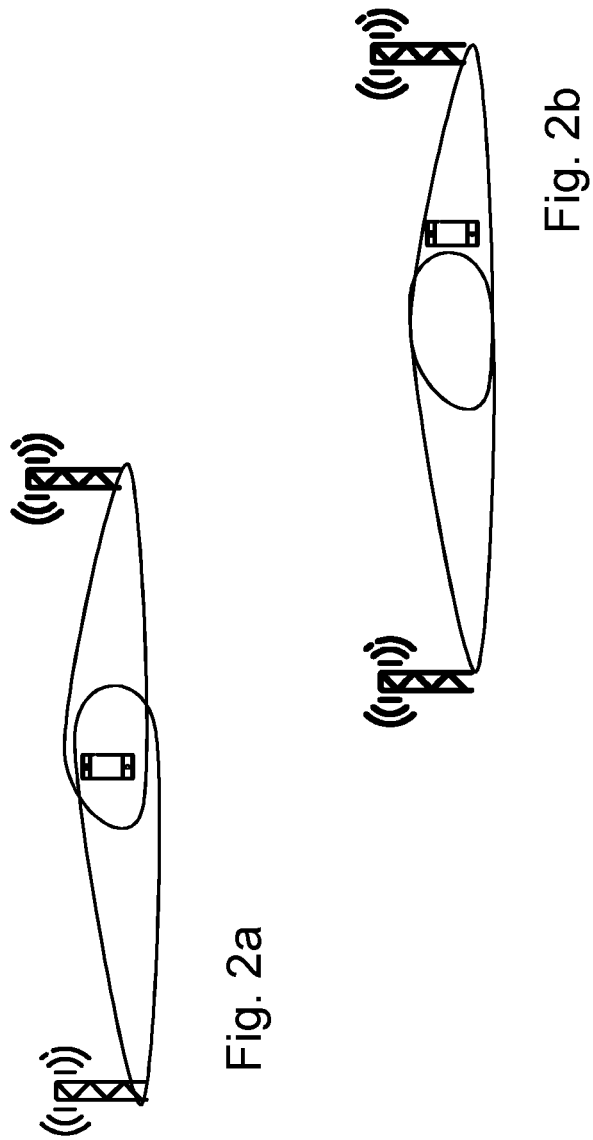
FIGS. 2a and 2b are schematic diagrams illustrating prior art scenarios.

FIG. 2a: The UE is served by the left RN and is moving from left to right. In FIG. 2a the UE is at a position where a Handover (HO) to the right RN may be considered when optimizing the channel quality to the UE. In FIG. 2b the UE has moved further to the right and does not have coverage from the left RN, which can cause a drop if a HO has not been initiated. If the left RN has information about the coverage of the right RN, this can be used for optimization of the HO procedure.

Figure 3:
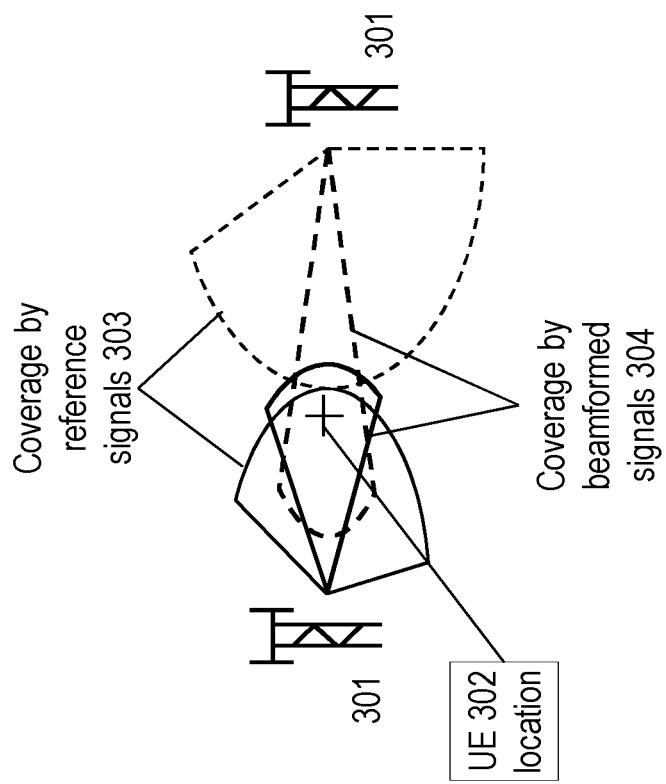
FIG. 3 is a schematic diagram illustrating prior art scenarios.

As basis for deciding from which RN a UE shall be served, downlink (DL) measurements reported by the UE to the serving RN are often used. The UE measures some suitable reference signals from the serving and from neighbor RNs and reports these to the serving RN. These reference signals are broadcasted by the RNs so that all UEs within radio coverage of the respective RNs can receive them. The broadcast may therefore result in shorter range and thereby the reference signals will not cover the same area as the beamformed transmissions dedicated for specific UEs. There will then be areas where it should be better to handover a UE to another RN, but in which the reference signals cannot be used to take the decision. The reason for handing over the UE in such a scenario may e.g. be lower load or better beamforming capabilities in the neighbor RN. See FIG. 3. FIG. 3 illustrates two RNs 301, a UE 302 location, and different coverage by broadcasted reference signals 303 and beamformed signals 304 transmitted from the respective RN 301.

RLF Indication Information

In LTE an RN such as a an eNB may collect statistics about Handovers (HO) and Radio Link Failures (RLF) together with re-establishment information. The information may be used when tuning cell borders to improve the HO functionality. One message used for transmitting information is the RLF indication message in 3GPP TS 36.423. The RLF Indication Message carries information about connection failure and re-establishment for a UE. The RLF indication message is specified by 3GPP TS 36.423.

A UE RLF report container in the RLF indication message is optional, which means that it is not mandatory to provide any information. If the RLF indication message contains an RLF-Report-r9 IE it may contain data from UE measurements.

The RLF-Report-r9 IE may contain UE measurements from both last serving cell and neighbour cells, but there is no way to ensure which measurements that are reported since that depends on which measurements that were configured in the UE. There is also no way to control in which phase, e.g. when the RLF was triggered or when the re-establishment was initiated, the measurements were performed.

The problem is that today's measurements to trigger a handover cannot take into account the different coverage by the broadcast and beamformed transmissions in the serving and neighbor nodes. The feedback provided today can only include measurements of the broadcasted transmissions before the change of RN, and not the actual radio channel characteristics that the UE experiences after the change in a possibly beamformed and multi-layered transmission.

Embodiments herein may refer to Inter-node Feedback for Mobility Optimization. Characteristics of a radio connection in the new serving RN also referred to as target RN, is fed back from the new serving RCN, such as the new serving RCF, to the previous serving RCN such as the previous serving RCF. The feedback may e.g. be used to adjust the thresholds for change of RN for UEs. The feedback may e.g. include UE received signal power and quality such as Reference Signal Received Power (RSRP) and Reference Signal Received Quality (RSRQ), uplink radio signal strength and quality, radio channel transmission bandwidth, including one or more layers, one or more antenna points etc., RN internal data transmission delay and energy consumption.

Figure 4:
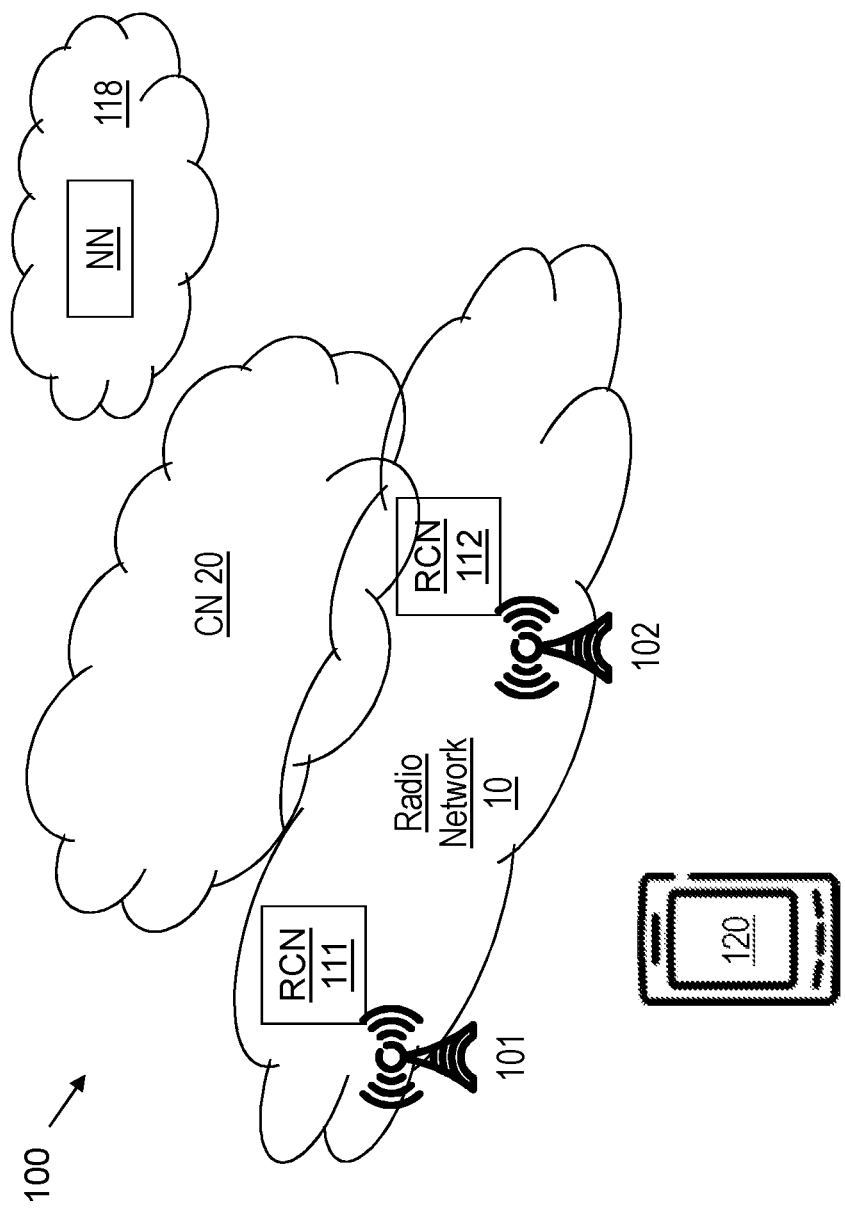
FIG. 4 is a schematic block diagram illustrating embodiments of a communications network.

Embodiments herein relate to radio networks in general. FIG. 4 depicts an example of a wireless communications network 100 in which embodiments herein may be implemented. The wireless communications network 100 comprises one or more Radio Networks 10 and one or more CNs 20. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

The wireless communication network 100 comprises a number of radio nodes whereof a first radio node 101 and a second radio node 102 are depicted in FIG. 4. The first radio node 101 provides radio coverage over a geographical area which may also be referred to as a beam or a beam group of a first Radio Access Technology (RAT), such as 5G, LTE, Wi-Fi or similar. The beam or a beam group provided by the first radio node 101 comprises a first beam. The second radio node 102 provides radio coverage over a geographical area which may also be referred to as a beam or a beam group of a second RAT, such as 5G, LTE, Wi-Fi or similar. The beam or a beam group provided by the second radio node 102 comprises a second beam. The first and second RAT may be the same or different.

The respective radio nodes 101, 102 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective radio nodes 101, 102 depending e.g. on the first radio access technology and terminology used. The respective first and second radio nodes 101, 102 may act as a serving radio node and communicate with UEs such as UE 120 with Downlink (DL) transmissions to the UE 120 and Uplink (UL) transmissions from the UE 120.

Radio Control Functions (RCF) are provided in the radio network 100 by Radio Control Nodes (RCNs). According to embodiments herein a first RCN 111 provides Radio Control Functions e.g. by means of a first RCF comprised in the first RCN 111 and a second RCN 112 provides Radio Control Functions e.g. by means of a second RCF comprised in the second RCN 112. However, according to embodiments herein the first RCN 111 and the second RCN 112 may be the same network node, or may be collocated and the first RCF and second RCF may be the same RCF.

A number of UEs operate in the wireless communication network 10, whereof only one, a UE 120 is depicted in FIG. 4. The UE 120 may e.g. be a mobile station, a non-access point (non-AP) STA, a STA, a wireless terminals, and is capable of communicating via one or more Radio Networks 100, e.g. RAN, to one or more CNs. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Some actions in methods herein are performed by any of the first and second RCNs 111, 112. As an alternative, any distributed Network Node (NN) and functionality such as the first RCF and the second RCF, e.g. comprised in a cloud 118 may be used for performing these actions.

In an example scenario, the UE 120 has just changed its radio connection from the first radio node 101 controlled by the first RCN 111, to the second radio node 102 controlled by the second RCN 112. When the new radio connection is established, the UE 120 reports DL radio characteristics to the second RCN 112 e.g. to the second RCF in the second RCN 112, controlling the second radio node 102. The second RCN 112 sends the feedback comprising reported characteristics together with UL radio characteristics for the UE 120, to the first RCN 111, e.g. to its RCF, previously controlling the UE 120

These parameters may for example be used for tuning of mobility parameter settings.

Figure 5:
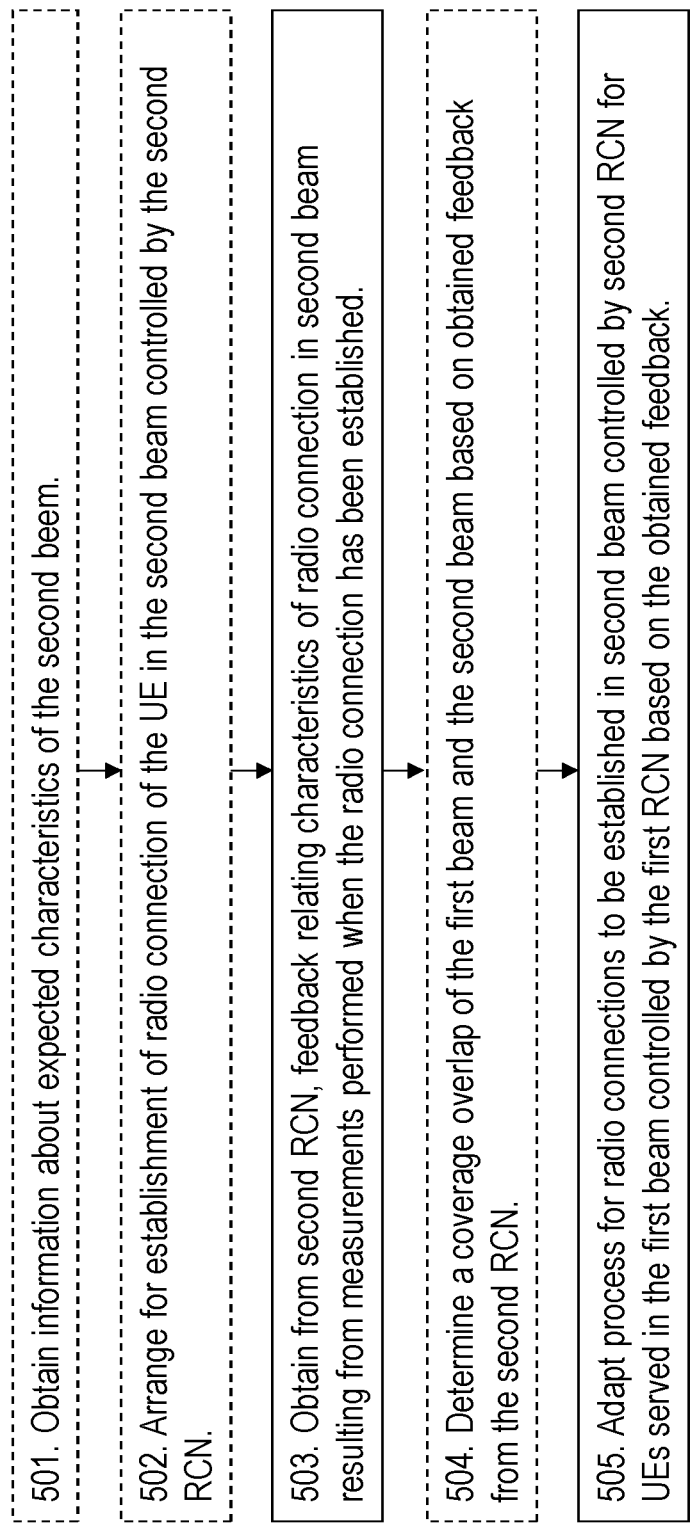
FIG. 5 is a flowchart depicting embodiments of a method in a first RCN.

Example embodiments of a method performed by the first RCN for handling radio connections to be established in a second beam controlled by the second RCN 112 for UEs served in a first beam controlled by the first RCN 111, will now be described with reference to a flowchart depicted in FIG. 5. The method may further be performed by the first RCF comprised in the first RCN 111. The method will first be described in a view seen from the first RCN 111 together with FIG. 5. Then the method will be described in a view seen from the second RCN 112 together with FIG. 6, followed by the method described in a view seen from the UE 120 together with FIG. 7.

As mentioned above, the first RCN 111 may be the same radio node as the second RCN 112 or they may be co-located or placed in separate locations.

The method comprises the following actions, which actions may be taken in any suitable order. Actions that are optional are presented in dashed boxes in FIG. 5.

According to an example scenario, the UE 120 is under coverage of both the first beam provided by the first radio node 101 and the second beam provided by the second radio node 102. The UE 120 is served by the first radio node 101 providing the first beam controlled by the first RCN 111.

Action 501

This is an optional action e.g. in case of handover. According to the example scenario, the UE 120 is moving and it will soon leave the radio coverage provided by the first radio node 101 in the first beam but still be in radio coverage provided by the second beam and is therefore considering to change its radio connection to the second beam provided by the second radio node 102. Thus the first RCN 111 may obtain information about expected characteristics of the second beam. The information about the expected characteristics of the second beam is based on measurements performed when the UE 120 is connected to the first radio node 101 providing the first beam controlled by the first RCN 111. This action by obtaining information about expected characteristics of the second beam before the radio connection in the second beam is established is performed according to prior art methods.

Action 502

This is an optional action e.g. in case of handover. When the expected characteristics of the second beam fulfils one or more criteria, the first RCN 111 arranges for the establishment of the radio connection of the UE 120 in the second beam controlled by the second RCN 112. This action may be performed according to a process of changing radio connections for UEs from a first beam controlled by the first RCN 111 to a second beam controlled by a second RCN 112 according to prior art methods. The first RCN 111 may be configured with this process.

The establishment of radio connection may be due to any one out of: a handover decision, a radio link failure, and decision on an additional radio connection.

Action 503

According to embodiments herein, the UE 120 will perform measurements in the new established connection in the second beam, to feed back to the second RCN 112 which in turn will forward the feedback together with any measurement and information obtained by the second RCN 112 to the first RCN 111. This is to inform the first RCN 111 about the real quality of the new established radio connection in the second beam, since the first RCN 111 only knew the expected quality of a radio connection in the second beam obtained in Action 501. This feedback will then be used by the first RCN 111 to adapt a process for radio connections to be established in the second beam controlled by the second RCN 112 for UEs served in the first beam controlled by the first RCN 111 such as e.g. to adapt the process of changing radio connections for UEs from a first beam controlled by the first RCN 111 to a second beam controlled by a second RCN 112, see Action 505 below. The feedback may e.g. be conveyed to the first RCN 111 in a standardized message such as RLF Indication or Handover Report but also in another new message.

Thus, when a radio connection of the UE 120 served in a first beam controlled by the first RCN 111 has been established in the second beam controlled by a second RCN 112, the first RCN 111 obtains feedback from the second RCN 112. The feedback relates to information about the characteristics of a radio connection in the second beam resulting from measurements performed when the radio connection has been established between the UE 120 and a second radio node 102 providing the second beam.

The feedback may comprise any one or more out of:
reference signal received power, such as RSRP,
reference signal received quality, such as RSRQ,
radio channel transmission bandwidth,
radio interference characteristics,
radio link margins for beamforming, power etc.,
radio node internal data transmission delay,
energy consumption, and
time between RLF and re-connection.

Action 504

In one embodiment the time between RLF in the first beam and a re-connection in the second beam may be comprised in the feedback to the first RCN 111 such as to the first RCF comprised in the first RCN 111. It may be used for determining the coverage overlap such as if there is a coverage gap between the first beam provided by first radio node 101 and the second beam provided by the second radio node 102. This information on coverage overlap may be used for determining if the second beam is later a possible target for a HO of another UE.

Thus, in this embodiment, the first RCN 111 may determine a coverage overlap of the first beam and the second beam based on the obtained feedback from the second RCN 112.

Action 505

The first RCN 111 then adapts a process for radio connections to be established in the second beam controlled by the second RCN 112 for UEs served in the first beam controlled by the first RCN 111 based on the obtained feedback.

In this way the first RCN 111 providing the first beam gain knowledge about the coverage of the neighbour node and thereby can improve the mobility functionality. The information received about the radio channel etc. in the neighbour node such as the second radio node 102, may, together with stored information about the UE's 120 radio channel, data delays, energy consumption and ongoing services in the first radio node 101 providing the first beam, be used to take a better decision on when to move a UE such as any UE at a later time to a neighbour radio node such as the second radio node 102. E.g. signal power and quality in the new serving radio node such as the second radio node 102 may be compared with the last registered signal quality from the source radio node such as the first radio node 101, and thereby it may for example be determined if a HO shall be initiated earlier.

In this way RCNs such as the first RCN 111 may establish or change radio connections for UEs so that each UE gets served by the radio node and RCN that can provide the best connection, considering e.g. bitrate, link stability, latency and energy consumption. This may be valid for an individual UE, but also for the network including many UEs.

Figure 6:
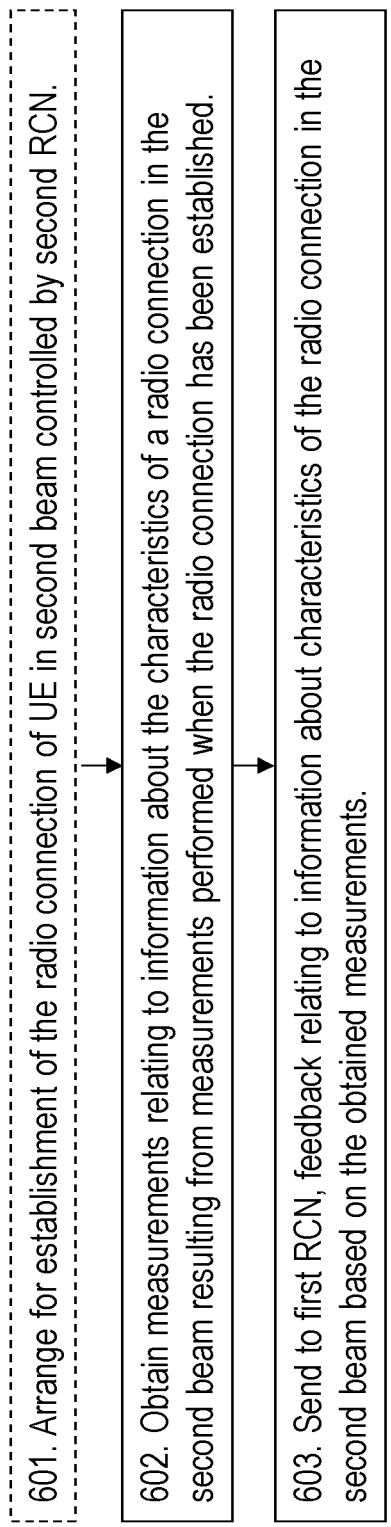
FIG. 6 is a flowchart depicting embodiments of a method in a second RCN.

Example embodiments of a method performed by the second RCN 112 for assisting the first RCN 111 in handling radio connections to be established in a second beam controlled by a second RCN 112 for UEs served in a first beam controlled by the first RCN 111, will be described with reference to a flowchart depicted in FIG. 6. The method may further be performed by the second RCF comprised in the second RCN 112.

The method comprises the following actions, which actions may be taken in any suitable order. Actions that are optional are presented in dashed boxes in FIG. 6.

Action 601

The second RCN 112 may arrange for the establishment of the radio connection of the UE 120 in the second beam controlled by the second RCN 112.

Action 602

When a radio connection of the UE 120 served in a first beam controlled by the first RCN 111 has been established in the second beam controlled by a second RCN 112, the second RCN 112 obtains measurements relating to information about the characteristics of a radio connection in the second beam resulting from measurements performed when the radio connection has been established between the UE 120 and a second radio node 102 providing the second beam.

The establishment of the radio connection may be due to any one out of: a handover decision, a radio link failure, and decision on an additional radio connection.

In some embodiments, the measurements relating to information about the characteristics of a radio connection in the second beam resulting from measurements performed when the radio connection has been established between the UE 120 and a second radio node 102 providing the second beam are obtained according to any one or more out of: received measurement results from the UE 120, and received results from measurements performed by a second radio node 102 providing the second beam.

Action 603

The second RCN 112 then sends feedback to the first RCN 111. The feedback relates to information about the characteristics of a radio connection in the second beam based on the obtained measurements, thereby assisting the first RCN 111 in adapting the process for radio connections to be established in the second beam controlled by the second RCN 112 for UEs served in the first beam controlled by the first RCN 111 based on the obtained feedback.

The feedback may comprise any one or more out of:
reference signal received power,
reference signal received quality,
radio channel transmission bandwidth
radio interference characteristics
radio link margins for beamforming, power etc
radio node internal data transmission delay
rank indication
channel-quality indication
energy consumption
time between RLF and re-connection.

Figure 7:
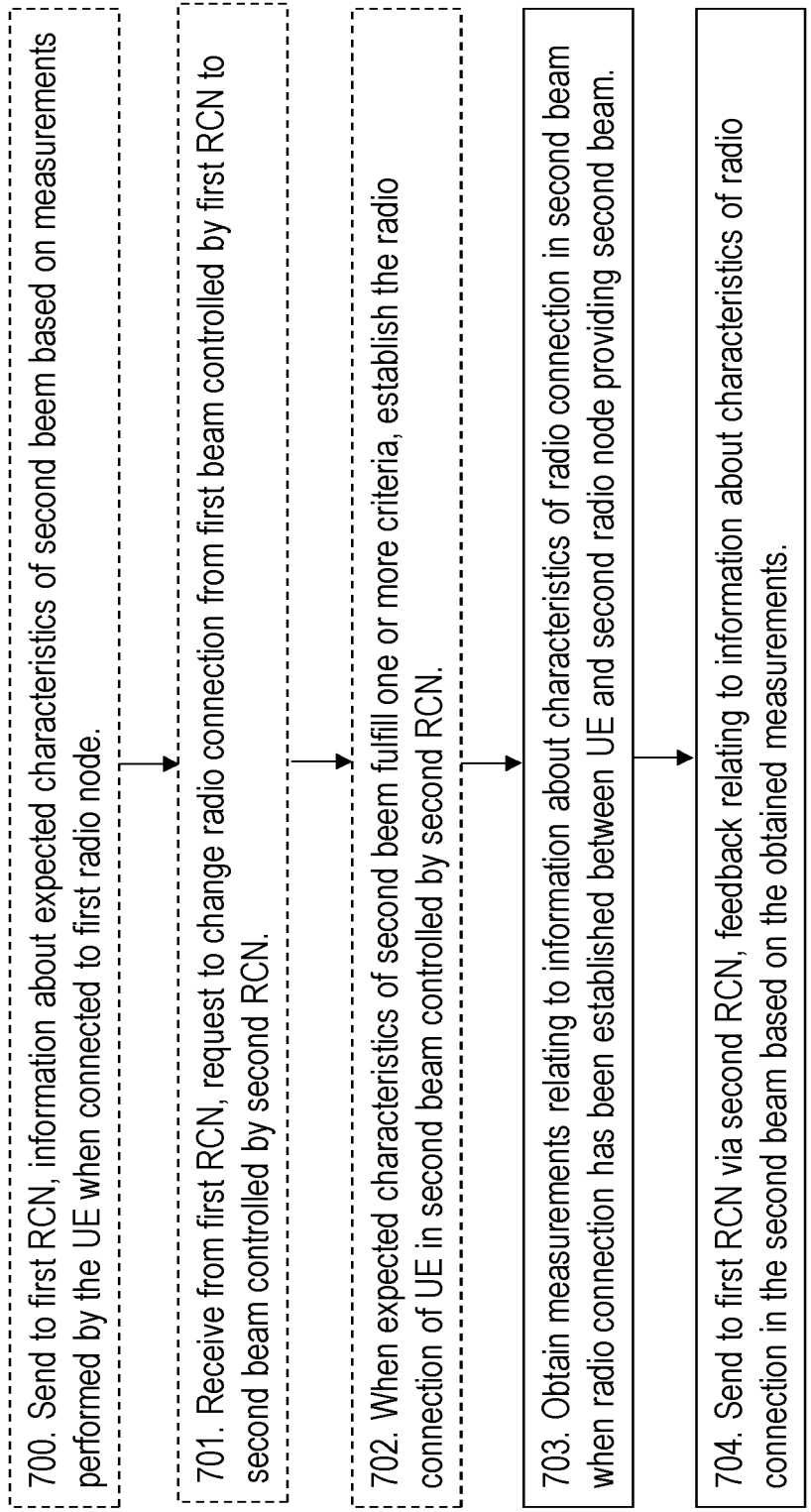
FIG. 7 is a flowchart depicting embodiments of a method in a UE.

Example embodiments of a method performed by the UE 120 for assisting the first RCN 111 in adapting a process for radio connections to be established in the second beam controlled by the second RCN 111 for UEs served in the first beam controlled by the first RCN 111, will be described with reference to a flowchart depicted in FIG. 7.

The method comprises the following actions, which actions may be taken in any suitable order. Actions that are optional are presented in dashed boxes in FIG. 7.

Action 700

In some embodiments, the UE 120 sends to the first RCN 111, information about expected characteristics of the second beam based on measurements performed by the UE 120 when the UE 120 is connected to a first radio node 101 providing the first beam controlled by the first RCN 111. These measurements are e.g. performed on the broadcasted reference signals from the neighbor radio nodes such as the second RN 102.

Action 701

In an example scenario relating to handover, the UE 120 may receive from the first RCN 111 a request to change the radio connection from the first beam controlled by the first RCN 111 to second beam controlled by second RCN 112.

Action 702

When a request to change radio connection has been received or when the expected characteristics of the second beam fulfill one or more criteria, the UE 120 may establish the radio connection of the UE 120 in the second beam controlled by the second RCN 112. This is in the case of a handover decision. In other alternatives the establishment of radio connection may be due to RLF or additional radio link establishment.

Action 703

When a radio connection of a UE 120 served in a first beam controlled by the first RCN 111 has been established in the second beam controlled by a second RCN 112, the UE 120 obtains measurements relating to information about the characteristics of a radio connection in the second beam. This results from measurements performed when the radio connection has been established between the UE 120 and a second radio node 102 providing the second beam.

As mentioned above, the establishment of radio connection may be due to any one out of: a handover decision, a radio link failure, and decision on an additional radio connection.

Action 704

The UE 120 then sends feedback to the first RCN 111 via the second RCN 112. The feedback relates to information about the characteristics of a radio connection in the second beam based on the obtained measurements, thereby assisting the first RCN 111 in adapting the process for radio connections to be established in the second beam controlled by the second RCN 112 for UEs served in the first beam controlled by the first RCN 111 based on the obtained feedback.

The feedback may comprise any one or more out of:
reference signal received power,
reference signal received quality,
radio interference characteristics
radio link margins for beamforming, power etc
rank indication
channel-quality indication
energy consumption
time between RLF and re-connection.

Embodiments herein will now be further described and exemplified. The text below is applicable to and may be combined with any suitable embodiment described above.

As mentioned above in the background section and illustrated in FIG. 3, the introduction of narrow beams for data transmissions to UEs, in combination with wider beams for broadcasted reference signals, may result in different coverage for transmission depending on if it is broadcasted or beam formed.

To overcome that the broadcasted signals don't give full knowledge about the coverage and data channel quality from a neighbor node, embodiments herein let the UE 120 measure and report information e.g. about beamformed transmissions after connecting to a new radio node, such as the second radio node 102 e.g. due to a handover, an additional radio connection, or after experiencing a RLF. When the UE 120 connects to the second radio node 102 providing the second beam, the control function such as the second RCF in the second RCN 112, may request e.g. via the second radio node 102, information from the UE 120. This information may then be sent to the previous serving RCF, e.g. the first RCN 111 such as to the first RCF comprised in the first RCN 111, controlling the previous RN such as the first radio node 101, e.g. from which the UE performed a handover or experienced a RLF.

Figure 8:
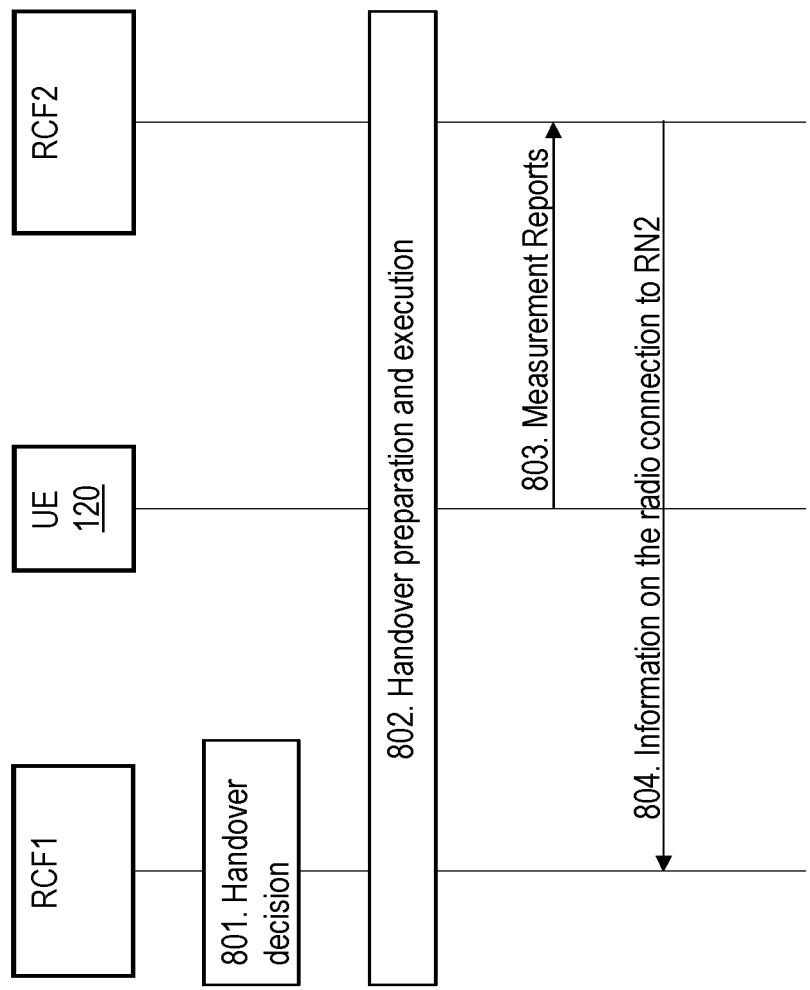
FIG. 8 is a signalling diagram depicting embodiments of a method.

An example of embodiments herein is illustrated by a signalling chart depicted in FIG. 8. FIG. 8 depicts a signalling example showing feedback of information on the new established radio connection in the second beam in case of handover.

The first RCN 111 e.g. by means of the first RCF, referred to as RCF1 in FIG. 8, decides 801 that a radio connection of the UE 120 shall be changed from the first beam controlled by the first RCN 111 to the second beam controlled by a second RCN 112, in this case this is a handover decision.

A handover preparation and execution is performed 802 meaning that a new radio connection is established between the UE 120 and the second radio node 102 controlled by the second RCN 112 e.g. by means of the second RCF, referred to as RCF2 in FIG. 8. Thus the radio connection is changed from the first beam controlled by the first RCN 111 to the second beam controlled by a second RCN 112.

When the new radio connection is established between the UE 120 and the second radio node 102, the UE 120 performs measurements of the new radio connection and reports 803 the measurement results to the second RCN 112. The second RCN 112 receives the measurement results from the UE 120 and may also perform measurements of the new radio connection or receive measurement results of the new radio connection from the second radio node 102.

The second RCN 112 then sends 804 feedback to the first RCN 111 such as the first RCF, which feedback comprises information relating to the obtained measurement results of the new radio connection, such as the measurements reported by the UE 120 and any measurement results performed by the second RCN 112 and/or obtained measurement results from the second radio node 102.

Figure 9:
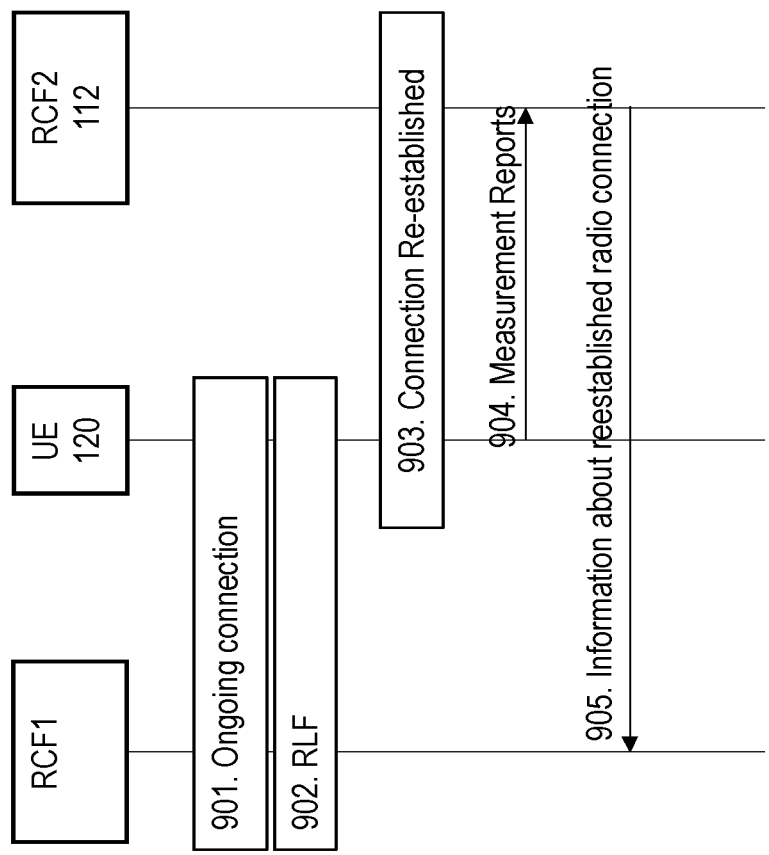
FIG. 9 is a signalling diagram depicting embodiments of a method.

An example of embodiments herein is illustrated by a signalling chart depicted in FIG. 9. FIG. 9 depicts a signalling example showing where the new information may be added in case of RLF.

A radio connection between the UE 120 and the first radio node 101 is going on 901 in the first beam controlled by the first RCN 111, e.g. by the first RCF. The first RCF is referred to as RCF1 in FIG. 9.

An RLF 902 of the radio connection between the UE 120 and the first radio node 101 is experienced.

A new radio connection is established 903 between the UE 120 and the second radio node 102 controlled by the second RCN 112 e.g. by means of the second RCF, referred to as RCF2 in FIG. 9. Thus the radio connection is changed from the first beam controlled by the first RCN 111 to the second beam controlled by a second RCN 112.

When the new radio connection is established between the UE 120 and the second radio node 102, the UE 120 performs measurements of the new radio connection and reports 904 the measurement results to the second RCN 112. The second RCN 112 receives the measurement results from the UE 120 and may also perform measurements of the new radio connection or receive measurement results of the new radio connection from the second radio node 102.

The second RCN 112 then sends 905 feedback to the first RCN 111 such as the first RCF, which feedback comprises information relating to the obtained measurement results of the new radio connection, such as the measurements reported by the UE 120 and any measurement results performed by the second RCN 112 and/or obtained measurement results from the second radio node 102.

Thus, these embodiments include information for example about the signal strength and quality from the new serving node such as the second RCN 112, in e.g. an RLF indication signal sent back to the node such as the first RCN 111, where the UE 120 experienced Radio Link Failure.

The first RCN 111 then uses the feedback to adapt the process of radio connections to be established in the second beam controlled by the second RCN 112 for UEs served in the first beam controlled by the first RCN 111 which ibn this example comprises changing radio connections for UEs from the first beam controlled by the first RCN 111 to the second beam controlled by the second RCN 112. In some embodiments, the first RCN 111 may use the feedback for example when tuning handover settings.

The feedback information may further be used for deciding when to set up an additional connection between the radio network and a UE, when a UE can be moved to another radio node to balance load or when UEs can be moved to other radio nodes to enable energy savings.

The feedback information about the new established radio connection may be provided both for downlink and uplink channels, since not all frequencies will have reciprocity between uplink and downlink.

Some examples of embodiments of the methods performed by the first RCN 111 and the second RCN 112 will further be described below.

Figure 10:
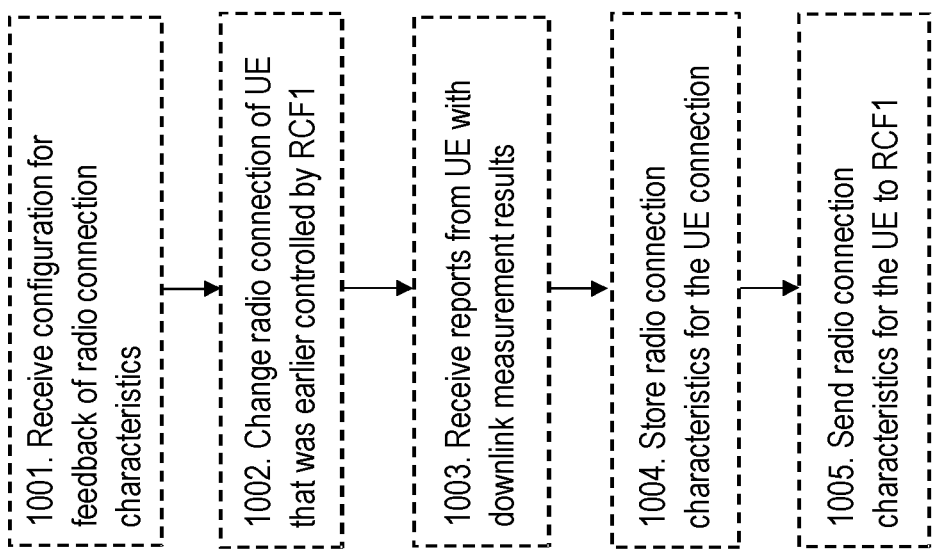
FIG. 10 is a flowchart depicting embodiments of a method in a first RCN.

FIG. 10 depicts an example embodiment of the method performed by the second RCN 112. FIG. 10 depicts an example method in the second RCN 112 e.g. by means of the second RCF, referred to as RCF2 in FIG. 10, for feeding back on radio connection characteristics to the first RCN 111 e.g. by means of the first RCF, referred to as RCF1 in FIG. 10.

The second RCN 112 may receive 1001 e.g. from an operation and maintenance system (OaM), from the first RCN or from another network node, a configuration for assisting in adapting a process of radio connections to be established in the second beam controlled by the second RCN 112 for UEs served in the first beam controlled by the first RCN 111 which in this example comprises changing radio connections for UEs from a first beam controlled by the first RCN 111 to a second beam controlled by a second RCN 112, such as e.g. for feedback of radio connection characteristics. This is to enable the first RCN 111 to adapt the process of moving UEs from the first beam to other beams, which is made to provide the best connection to a UE, to even out load in the network or to save energy. This is an optional action in this example.

The radio connection of the UE 120 is then changed 1002 from the first beam controlled by the first RCN 111 to the second beam controlled by a second RCN 112.

The second RCN 112 may then receive 1003 reports from the UE 120 with downlink measurement results of the new established radio connection controlled by the second RCN 112. The second RCN 112 may further determine radio connection characteristics.

The second RCN 112 may store 1004 the radio connection characteristics for the UE connection. This is to gather information on the connection over a period. This is an optional action in this example.

The second RCN 112 then sends 1005 to the first RCN 111 such as e.g. the first RCF, feedback comprising information about the radio connection characteristics of the new established radio connection for the UE 120.

Figure 11:
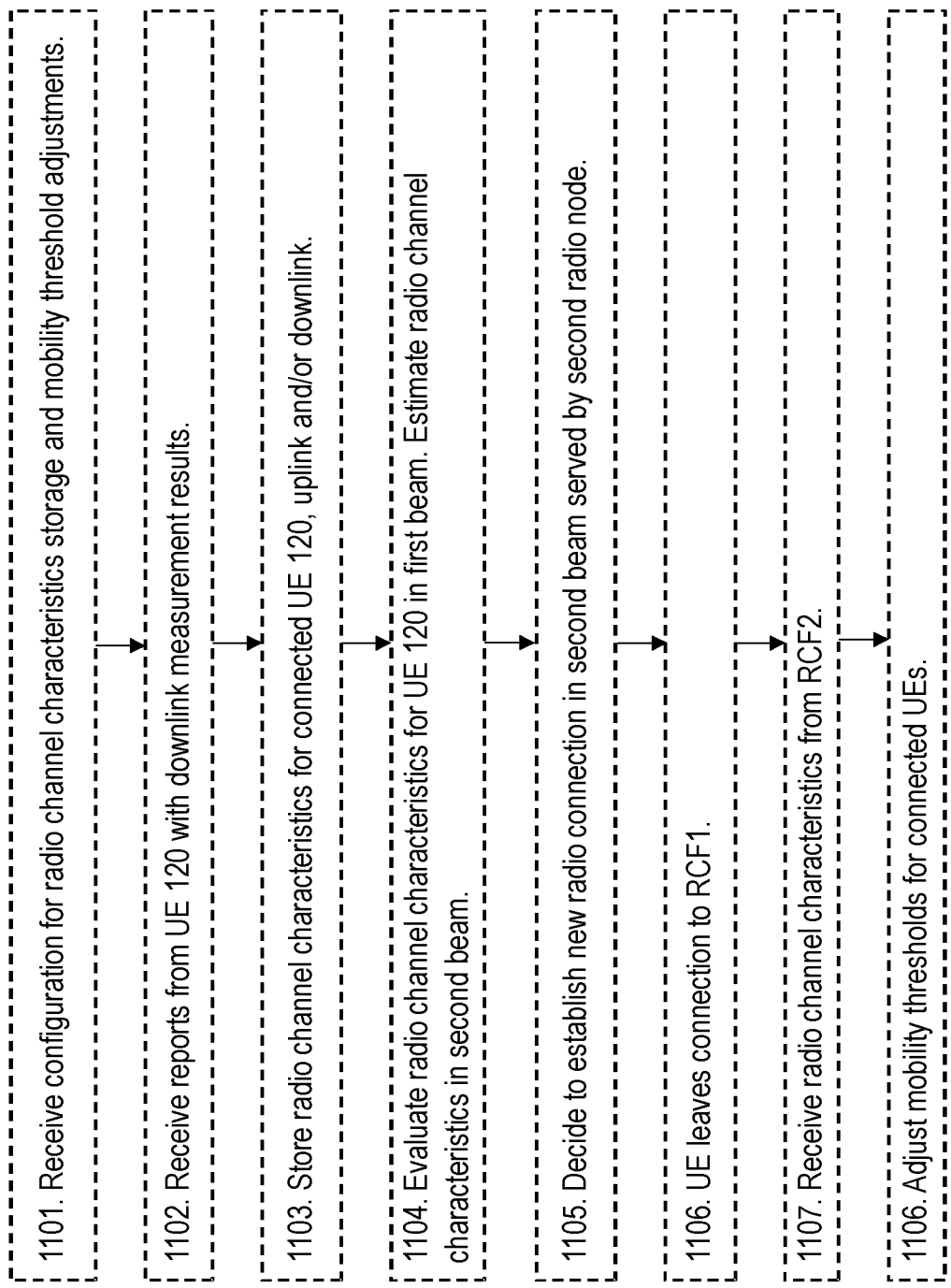
FIG. 11 is a flowchart depicting embodiments of a method in a second RCN.

FIG. 11 depicts an example embodiment of the method performed by the first RCN 111. FIG. 11 depicts an example method in the first RCN 111 e.g. by means of the first RCF, referred to as RCF1 in FIG. 11, for receiving feeding back on radio connection characteristics from the second RCN 112 e.g. by means of the second RCF, referred to as RCF2 in FIG. 11.

The first RCN 111 receives 1101 e.g. from an OaM node or another network node, configuration for adapting a process of radio connections to be established in the second beam controlled by the second RCN 112 for UEs served in the first beam controlled by the first RCN 111 which in this example comprises adapting a process of changing radio connections for UEs from a first beam controlled by the first RCN 111 to a second beam controlled by a second RCN 112, such as e.g. configuration for radio channel characteristics storage, mobility threshold adjustments, load balancing between radio nodes and RCNs and energy saving in the radio network.

The radio connection of the UE 120 is to be established in the second beam controlled by the second RCN 112 such as in this example, be changed from the first beam controlled by the first RCN 111 to the second beam controlled by the second RCN 112. The first RCN 111 may receive 1102 reports from the UE 120 with downlink measurement results of the radio connection in the second beam controlled by the second RCN 112 before the new radio connection is established.

The first RCN 111 stores 1103 radio channel characteristics for connected UE in uplink and/or downlink of the radio connection in the first beam. This is to have a history of radio connection characteristics for the UE stored in RCN 111.

The first RCN 111 may evaluate 1104 radio channel characteristics for the UE 120 in the first beam and estimate radio channel characteristics in beam served by second radio node 102.

Action 1102, 1103 and 1104 may be repeated, since several reports may be received from the UE 120 and stored before a decision is made to establish a new connection in the second beam. This is to have more characteristics data to base the decision on for establishing a connection in the second beam.

Based on any of the Actions 1102, 1103 and 1104 above, the first RCN 111 then decides 1105 whether to establish the new radio connection in the second beam served by second radio node 102.

The radio connection of the UE 120 is then changed from the first beam controlled by the first RCN 111 to the second beam controlled by the second RCN 112 and the UE 120 leaves 1106 the connection to the first RCN 111 such as e.g. the first RCF1.

When the new radio connection in the second beam controlled by the second RCN 112 has been established, the first RCN 111 receives 1107 feedback comprising radio channel characteristics from the second RCN 112 such as e.g. the second RCF, RCF2.

The first RCN 111 then adapts a process for radio connections to be established in the second beam controlled by the second RCN 112 for UEs served in the first beam controlled by the first RCN 111 based on the obtained feedback. One such example is to adjust 1108 mobility thresholds for UEs connected in the first beam.

In one embodiment the new serving node such as the second RCN 112 may also include information about the degree of beamforming, transmission power and other parameters for the new established radio link. These may then be used by the first RCN 111 together with the UE 120 measurements described earlier. Information about degree of beamforming and transmission power is useful when assessing the UE 120 measurements since for example the measured RSRP is dependent on both transmitted power and antenna gain/beam form. Also, information on energy consumption for serving the UE 120 and time between an RLF and a re-establishment of the radio connection may be included which may be considered by the first RCN 111 when evaluating a possible setup of a connection in the second beam.

It should be noted that the first RCF and the second RCF may be in different nodes, in the same node or be the same RCF. Further, it should be noted that the first RCN 111 and the second RCN 112 may be different nodes, collocated in the same radio control node or be the same RCN.

Figure 12:
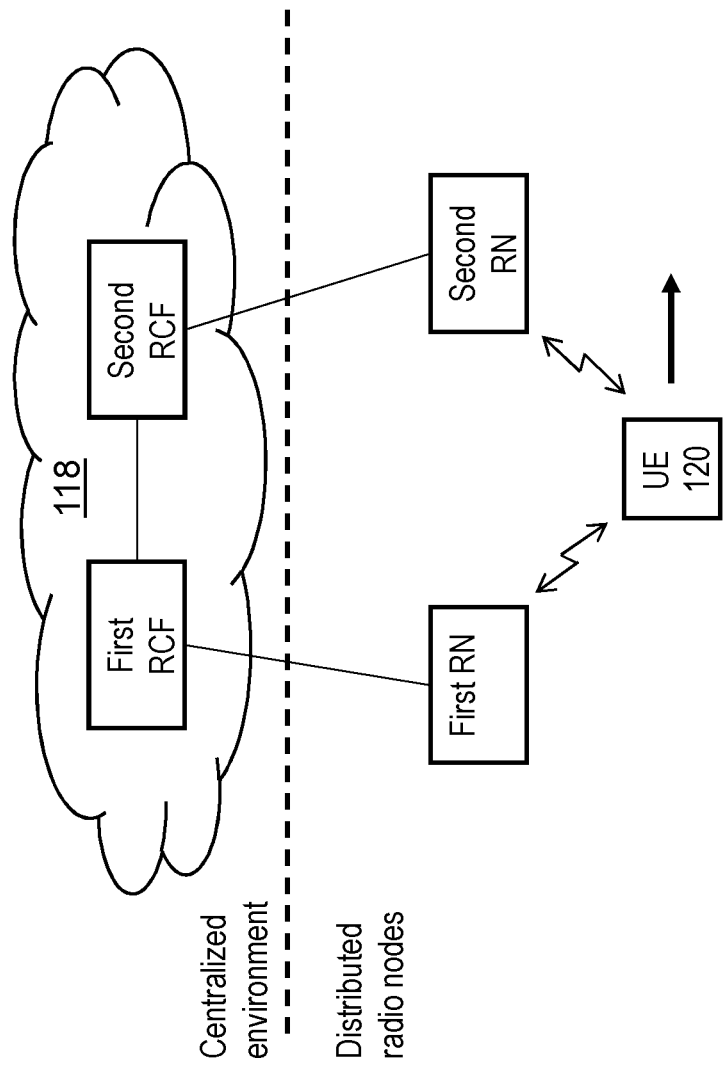
FIG. 12 is a schematic block diagram illustrating embodiments of a communications network.

As mentioned above, some actions in methods herein are performed by any of the first and second RCNs 111, 112. As an alternative, any NN such as any distributed NN and functionality such as the first RCF and the second RCF, e.g. comprised in a cloud 118 may be used for performing these actions. FIG. 12 depicts radio control functions in a centralized computing environment in the cloud 118.

Figure 13:
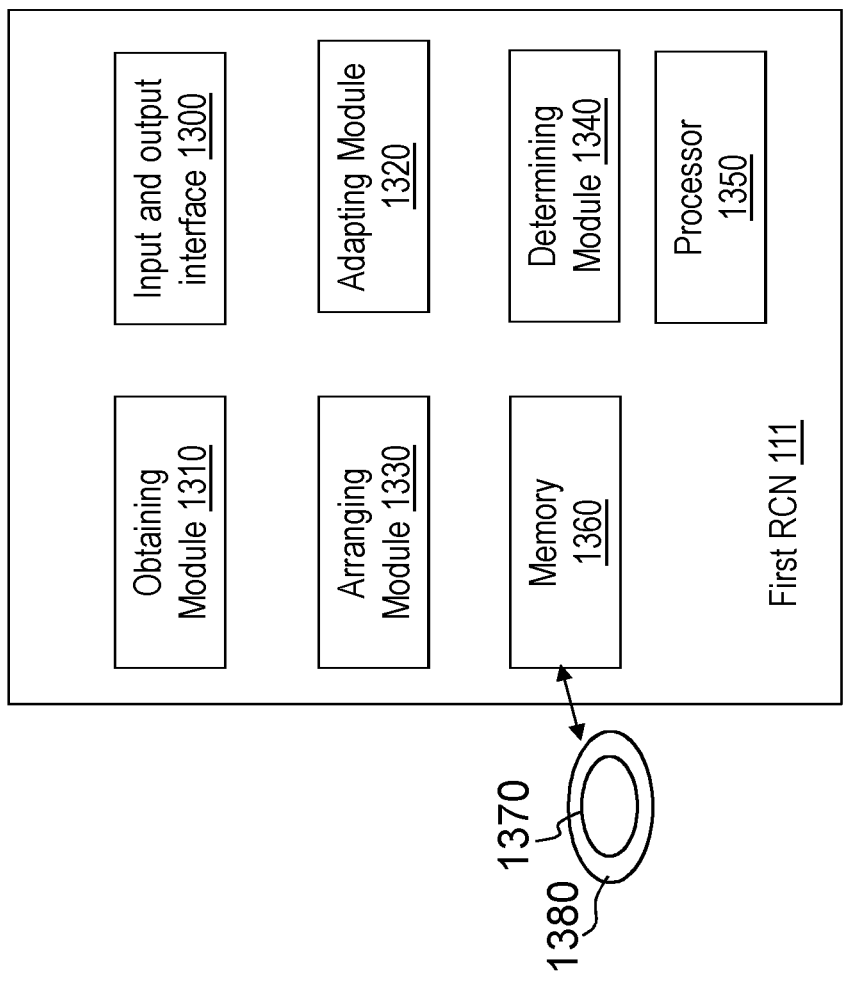
FIG. 13 is a schematic block diagram illustrating embodiments of a second RCN.

To perform the method actions for handling radio connections to be established in a second beam controlled by a second RCN 112 for UEs served in a first beam controlled by the first RCN 111, the first RCN 111 may comprise the following arrangement depicted in FIG. 13.

The first RCN 111 comprises an input and output interface 1300 configured to communicate, with one or more radio nodes such as the first and/or second radio nodes 101, 102, other RCNs such as the second RCN, core network or OaM nodes. The input and output interface 1300 may comprise a receiver (not shown) and a transmitter (not shown).

The first RCN 111 is configured to, e.g. by means of an obtaining module 1310 configured to, when a radio connection of a UE 120 served in a first beam controlled by the first RCN 111 has been established in the second beam controlled by a second RCN 112, obtain feedback from the second RCN 112. The feedback is adapted to be related to information about the characteristics of a radio connection in the second beam resulting from measurements performed when the radio connection has been established between the UE 120 and a second radio node 102 providing the second beam.

The establishment of radio connection may be adapted to be due to any one out of: a handover decision, a radio link failure, and decision on an additional radio connection.

The first RCN 111 is further configured to, e.g. by means of an adapting module 1320 configured to, adapt a process for radio connections to be established in the second beam controlled by the second RCN 112 for UEs served in the first beam controlled by the first RCN 111 based on the obtained feedback.

The feedback may comprise any one or more out of:
reference signal received power,
reference signal received quality,
radio channel transmission bandwidth
radio interference characteristics
radio link margins for beamforming, power etc
radio node internal data transmission delay
rank indication
channel-quality indication
energy consumption, and
time between RLF and re-connection.

The first RCN 111 may further be configured to, e.g. by means of the obtaining module 1310 configured to, obtain information about expected characteristics of the second beam based on measurements performed when the UE 120 is connected to a first radio node 101 providing the first beam controlled by the first RCN 111.

The first RCN 111 may further be configured to, e.g. by means of an arranging module 1330 configured to, when the expected characteristics of the second beam fulfils one or more criteria, arrange for the establishment of the radio connection of the UE 120 in the second beam controlled by the second RCN 112.

The first RCN 111 may further be configured to, e.g. by means of a determining module 1340 configured to, determine a coverage overlap of the first beam and the 15 second beam based on the obtained feedback from the second RCN 112.

The embodiments herein for handling radio connections to be established in a second beam controlled by a second RCN 112 for UEs served in a first beam controlled by the first RCN 111, may be implemented through one or more processors, such as a processor 1350 of a processing circuitry in the first RCN 111 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the first RCN 111. One such carrier may be in the form of a CD ROM disc. It is however feasible with other data carriers such as a memory stick. The computer program code may furthermore be provided as pure program code on a server and downloaded to the first RCN 111.

The first RCN 111 may further comprise a memory 1360 comprising one or more memory units. The memory 1360 comprises instructions executable by the processor 1350. The memory 1360 is arranged to be used to store e.g. information, configuration information, feedback, data, and applications to perform the methods herein when being executed in the first RCN 111.

In some embodiments, a computer program 1370 comprises instructions, which when executed by the at least one processor 1350, cause the at least one processor 1350 to perform actions according to any of the Actions 501-505.

In some embodiments, a carrier 1380 comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first RCN 111, described above may refer to a combination of analog and digital circuits, and/or one or more processors configured with software and/or firmware, e.g. stored in the memory 1360, that when executed by the one or more processors such as the processor 1350 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 14:
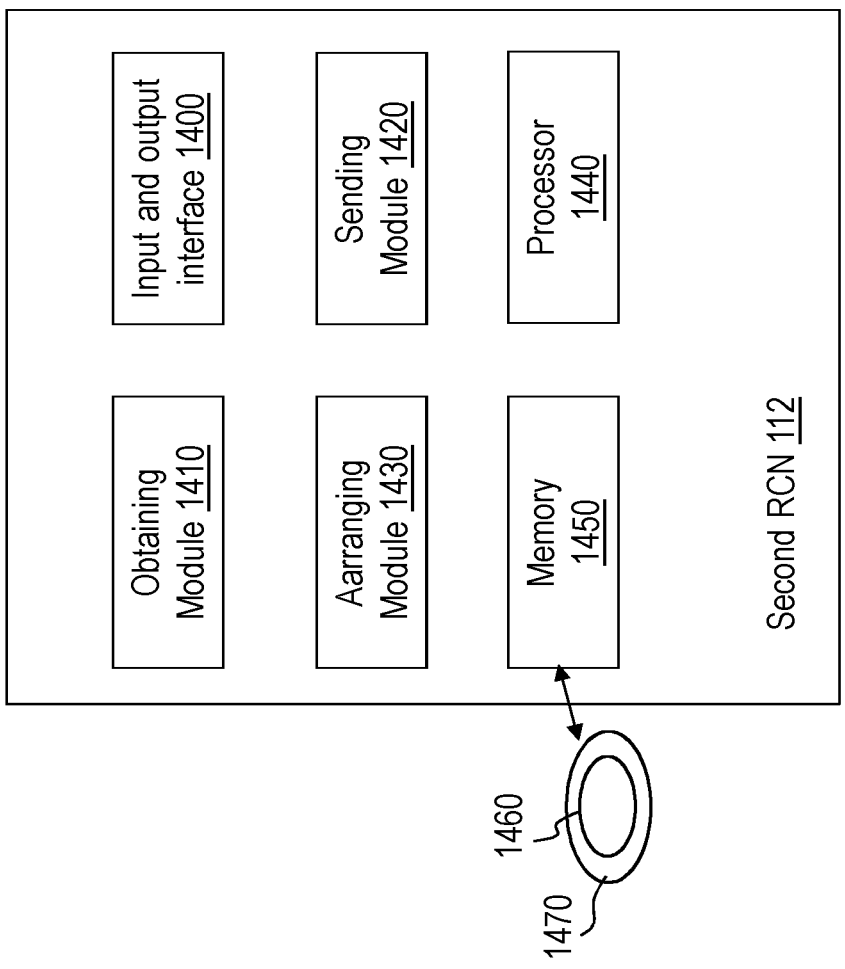
FIG. 14 is a schematic block diagram illustrating embodiments of a first RCN.

To perform the method actions for handling radio connections to be established in a second beam controlled by a second RCN 112 for UEs served in a first beam controlled by the first RCN 111, the second RCN 112 may comprise the following arrangement depicted in FIG. 14

The second RCN 112 comprises an input and output interface 1400 configured to communicate, with one or more radio nodes such as the first and/or second radio nodes 101, 102, other RCNs such as the first RCN an OaM node or a core network. The input and output interface 1400 may comprise a receiver (not shown) and a transmitter (not shown).

The second RCN 112 is configured to, e.g. by means of an obtaining module 1410 configured to, when a radio connection of a UE 120 served in a first beam controlled by the first RCN 111 has been established in the second beam controlled by a second RCN 112, obtain measurements relating to information about the characteristics of a radio 35 connection in the second beam, resulting from measurements performed when the radio connection has been established between the UE 120 and a second radio node 102 providing the second beam.

The establishment of radio connection may be adapted to be due to any one out of: a handover decision, a radio link failure, and decision on an additional radio connection.

The measurements relating to information about the characteristics of a radio connection in the second beam resulting from measurements performed when the radio connection has been established between the UE 120 and a second radio node 102 providing the second beam may be adapted to be obtained according to any one or more out of: Received measurement results from the UE 120, and received results from measurements performed by a second radio node 102 providing the second beam.

The feedback may comprise any one or more out of:
reference signal received power,
reference signal received quality,
radio channel transmission bandwidth,
radio interference characteristics,
radio link margins for beamforming, power etc.,
radio node internal data transmission delay,
rank indication,
channel-quality indication,
energy consumption, and
time between RLF and re-connection.

The second RCN 112 is further configured to, e.g. by means of a sending module 1420 configured to, send feedback to the first RCN 111. The feedback is adapted to relate to information about the characteristics of a radio connection in the second beam based on the obtained measurements, thereby assisting the first RCN 111 in adapting the process for radio connections to be established in the second beam controlled by the second RCN 112 for UEs served in the first beam controlled by the first RCN 111 based on the obtained feedback.

The second RCN 112 according to claim 22, further being configured to, e.g. by means of a arranging module 1430 configured to, arrange for the establishment of the radio connection of the UE 120 in the second beam controlled by the second RCN 112.

The embodiments herein for assisting a first RCN 111 in handling radio connections to be established in a second beam controlled by a second RCN 112 for UEs served in a first beam controlled by the first RCN 111, may be implemented through one or more processors, such as a processor 1440 of a processing circuitry in the second RCN 112 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the second RCN 112. One such carrier may be in the form of a CD ROM disc. It is however feasible with other data carriers such as a memory stick. The computer program code may furthermore be provided as pure program code on a server and downloaded to the second RCN 112.

The second RCN 112 may further comprise a memory 1450 comprising one or more memory units. The memory 1450 comprises instructions executable by the processor 1440.

The memory 1450 is arranged to be used to store e.g. information, configuration information, feedback, data, and applications to perform the methods herein when being executed in the second RCN 112.

In some embodiments, a computer program 1460 comprises instructions, which when executed by the at least one processor 1440, cause the at least one processor 1440 to perform actions according to any of the Actions 601-603.

In some embodiments, a carrier 1470 comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules comprised in the second RCN 112, described above may refer to a combination of analog and digital circuits, and/or one or more processors configured with software and/or firmware, e.g. stored in the memory 1450, that when executed by the one or more processors such as the processor 1440 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 15:
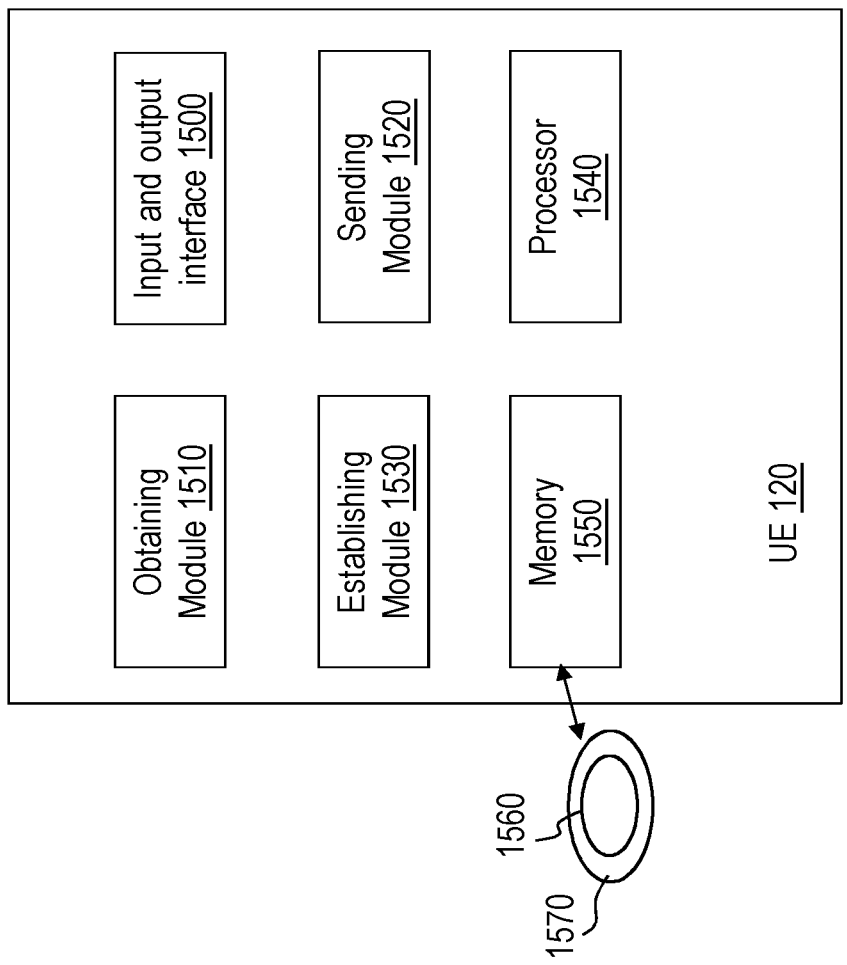
FIG. 15 is a schematic block diagram illustrating embodiments of a UE.

To perform the method actions for assisting a first Radio Control Node RCN 111 in adapting a process for radio connections to be established in the second beam controlled by the second RCN 111 for UEs served in the first beam controlled by the first RCN 111, the UE 120 may comprise the following arrangement depicted in FIG. 15.

The UE 120 comprises an input and output interface 1500 configured to communicate, with one or more radio nodes such as the first and/or second radio nodes 101, 102, other RCNs such as the first RCN, a core network or an OaM node. The input and output interface 1500 may comprise a wireless receiver (not shown) and a wireless transmitter (not shown).

The UE 120 is configured to, e.g. by means of an obtaining module 1510 being configured to, when a radio connection of a UE 120 served in a first beam controlled by the first RCN 111 has been established in the second beam controlled by a second RCN 112, obtain measurements relating to information about the characteristics of a radio connection in the second beam resulting from measurements performed when the radio connection has been established between the UE 120 and a second radio node 102 providing the second beam.

The establishment of radio connection may e.g. be due to any one out of: a handover decision, a radio link failure, and decision on an additional radio connection.

The UE 120 is configured to, e.g. by means of a sending module 1520 being configured to, send feedback to the first RCN 111 via the second RCN 112. The feedback is adapted to relate to information about the characteristics of a radio connection in the second beam based on the obtained measurements, thereby assisting the first RCN 111 in adapting the process for radio connections to be established in the second beam controlled by the second RCN 112 for UEs served in the first beam controlled by the first RCN 111 based on the obtained feedback.

The feedback may comprises any one or more out of:
reference signal received power,
reference signal received quality,
radio interference characteristics
radio link margins for beamforming, power etc.,
rank indication,
channel-quality indication,
energy consumption, and
time between RLF and re-connection.

The UE 120 may further be configured to, e.g. by means of the sending module 1520 being configured to, send to the first RCN 111, information about expected characteristics of the second beam based on measurements performed by the UE 120 when the UE 120 is connected to a first radio node 101 providing the first beam controlled by the first RCN 111.

The UE 120 may further be configured to, e.g. by means of a establishing module 1530 being configured to, when the expected characteristics of the second beam fulfill one or more criteria, establish the radio connection of the UE (120) in the second beam controlled by the second RCN (112).

The embodiments herein for assisting a first Radio Control Node RCN 111 in adapting a process for radio connections to be established in the second beam controlled by the second RCN 111 for UEs served in the first beam controlled by the first RCN 111 may be implemented through one or more processors, such as a processor 1540 of a processing circuitry in the UE 120 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1550 comprising one or more memory units. The memory 1550 comprises instructions executable by the processor 1540.

The memory 1550 is arranged to be used to store e.g information, configuration information, feedback, data, and applications to perform the methods herein when being executed in the UE 120.

In some embodiments, a computer program 1560 comprises instructions, which when executed by the at least one processor 1540, cause the at least one processor 1540 to perform actions according to any of the Actions 700-704.

In some embodiments, a carrier 1570 comprises the computer program 1560, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the UE 120, described above may refer to a combination of analog and digital circuits, and/or one or more processors configured with software and/or firmware, e.g. stored in the memory 1550, that when executed by the one or more processors such as the processor 1540 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Abbreviations

Abbreviation Explanation
DL Downlink
eNB Evolved Node B
HO Hand Over
IE Information Element
NR New Radio
PPN Packet Processing Node
RCF Radio Control Function
RCN Radio Control Node
RCU Radio Control Unit
RLF Radio Link Failure
RN Radio Node
RSRP Reference Signal Received Power
RSRQ Reference Signal Received Quality
UE User Equipment
UL Uplink

The invention claimed is:

1. A method performed by a first Radio Control Node (RCN) for handling a radio connection to be established in a second beam controlled by a second RCN for a User Equipment (UE) served in a first beam controlled by the first RCN, the method comprising:
obtaining information about expected characteristics of the second beam based on measurements performed when the UE is connected to a first radio node providing the first beam controlled by the first RCN;
when the expected characteristics of the second beam fulfill one or more criteria, arranging for an establishment of the radio connection of the UE to a second radio node providing the second beam and controlled by the second RCN;
when the radio connection of the UE, served in the first beam controlled by the first RCN, has been established in the second beam controlled by the second RCN, obtaining feedback from the second RCN, which feedback relates to information about the characteristics of the radio connection of the UE in the second beam resulting from measurements performed by the UE in the second beam after the radio connection has been established between the UE and the second radio node, together with measurement information obtained at the second RCN; and in response to obtaining the feedback and the measurement information from the second RCN, utilizing, at the first RCN, the feedback and the measurement information to determine a coverage overlap of the first beam and the second beam, in order for the first RCN to use the coverage overlap to consider transfer of another UE, at a later time, served in the first beam controlled by the first RCN to the second beam and under control of the second RCN.

2. The method according to claim 1, wherein the establishment of the radio connection in the second beam is due to any one out of: a handover decision, a radio link failure, and decision on an additional radio connection.

3. The method according to claim 1, wherein the feedback comprises any one or more out of:
reference signal received power,
reference signal received quality,
radio channel transmission bandwidth,
radio interference characteristics,
radio link margins for beamforming,
radio link margins for power,
radio node internal data transmission delay,
rank indication,
channel-quality indication,
energy consumption, and
time between RLF and re-connection.

4. The method according to claim 1, wherein the method is performed by a first Radio Control Function (RCF) comprised in the first RCN.

5. A method performed by a second Radio Control Node (RCN) for assisting a first RCN in handling a radio connection to be established in a second beam controlled by the second RCN for a User Equipment (UE) served in a first beam controlled by the first RCN, the method comprising:
when the radio connection of the UE, served in the first beam controlled by the first RCN, has been established in the second beam controlled by the second RCN, obtaining measurements relating to information about characteristics of the radio connection of the UE to a second radio node providing the second beam and controlled by the second RCN, the measurements relating to information about characteristics of the radio connection of the UE resulting from measurements performed by the UE in the second beam after the radio connection has been established between the UE and the second radio node; and
sending feedback to the first RCN, which feedback relates to the information about the characteristics of the radio connection in the second beam based on the obtained measurements by the UE, together with measurement information obtained at the second RCN, thereby, assisting the first RCN to determine a coverage overlap of the first beam and the second beam, in order for the first RCN to use the coverage overlap to consider transfer of another UE, at a later time, served in the first beam controlled by the first RCN to the second beam and under control of the second RCN.

6. The method according to claim 5, further comprising:
arranging for the establishment of the radio connection of the UE in the second beam controlled by the second RCN.

7. The method according to claim 5, wherein the measurements relating to information about the characteristics of the radio connection in the second beam resulting from measurements performed when the radio connection has been established between the UE and a second radio node providing the second beam are obtained by:
received measurement results from the UE, and the measurement information obtained at the second RCN is performed by the second radio node providing the second beam.

8. The method according to claim 5, wherein the feedback comprises any one or more out of:
reference signal received power,
reference signal received quality,
radio channel transmission bandwidth,
radio interference characteristics,
radio link margins for beamforming,
radio link margins for power,
radio node internal data transmission delay,
rank indication,
channel-quality indication,
energy consumption, and
time between RLF and re-connection.

9. The method according to claim 5, wherein the establishment of the radio connection in the second beam is due to any one out of: a handover decision, a radio link failure, and decision on an additional radio connection.

10. The method according to claim 5, wherein the method is performed by a second Radio Control Function (RCF) comprised in the second RCN.

11. A method performed by a User Equipment (UE) for assisting a first Radio Control Node (RCN) to provide for a radio connection to be established in a second beam controlled by a second RCN for the UE served in a first beam controlled by the first RCN, the method comprising:
sending to the first RCN, information about expected characteristics of the second beam based on measurements performed by the UE when the UE is connected to a first radio node providing the first beam controlled by the first RCN;
when the expected characteristics of the second beam fulfill one or more criteria, establishing the radio connection of the UE to a second radio node providing the second beam and controlled by the second RCN;
when the radio connection of the UE, served in the first beam controlled by the first RCN, has been established in the second beam controlled by the second RCN, obtaining measurements relating to information about the characteristics of the radio connection of the UE in the second beam resulting from measurements performed by the UE in the second beam after the radio connection has been established between the UE and the second radio node; and
sending feedback to the second RCN, which feedback relates to information about the characteristics of the radio connection in the second beam based on the obtained measurements performed by the UE in the second beam, wherein the second RCN sends the feedback, together with measurement information obtained at the second RCN, to the first RCN, thereby assisting the first RCN to determine a coverage overlap of the first beam and the second beam, in order for the first RCN to use the coverage overlap to consider transfer of another UE, at a later time, served in the first beam controlled by the first RCN to the second beam and under control of the second RCN.

12. The method according to claim 11, wherein the feedback comprises any one or more out of:
reference signal received power,
reference signal received quality,
radio interference characteristics,
radio link margins for beamforming,
radio link margins for power,
rank indication,
channel-quality indication,
energy consumption, and
time between RLF and re-connection.

13. The method according to claim 11, wherein the establishment of the radio connection in the second beam is due to any one out of: a handover decision, a radio link failure, and decision on an additional radio connection.

14. A first Radio Control Node (RCN) for handling a radio connection to be established in a second beam controlled by a second RCN for a User Equipment (UE) served in a first beam controlled by the first RCN, the first RCN comprising:
a processor; and
a memory comprising computer program code which, when executed by the processor, causes the first RCN to perform operations to:
obtain information about expected characteristics of the second beam based on measurements performed when the UE is connected to a first radio node providing the first beam controlled by the first RCN;
when the expected characteristics of the second beam fulfill one or more criteria, arrange for an establishment of the radio connection of the UE to a second radio node providing the second beam and controlled by the second RCN;
when the radio connection of the UE, served in the first beam controlled by the first RCN, has been established in the second beam controlled by the second RCN, obtain feedback from the second RCN, which feedback relates to information about the characteristics of the radio connection of the UE in the second beam resulting from measurements performed by the UE in the second beam after the radio connection has been established between the UE and the second radio node, together with measurement information obtained at the second RCN; and
in response to obtaining the feedback and the measurement information from the second RCN, utilizing, at the first RCN, the feedback and the measurement information to determine a coverage overlap of the first beam and the second beam, in order for the first RCN to use the coverage overlap to consider transfer of another UE, at a later time, served in the first beam controlled by the first RCN to the second beam and under control of the second RCN.

15. The first RCN according to claim 14, wherein the feedback comprises any one or more out of:
reference signal received power,
reference signal received quality,
radio channel transmission bandwidth,
radio interference characteristics,
radio link margins for beamforming,
radio link margins for power,
radio node internal data transmission delay,
rank indication,
channel-quality indication,
energy consumption, and
time between RLF and re-connection.

16. The first RCN according to claim 14, wherein the establishment of the radio connection in the second beam is due to any one out of: a handover decision, a radio link failure, and decision on an additional radio connection.

17. A second Radio Control Node (RCN) for assisting a first RCN in handling a radio connection to be established in a second beam controlled by the second RCN for a User Equipment (UE) served in a first beam controlled by the first RCN, the second RCN comprising:
a processor; and
a memory comprising computer program code which, when executed by the processor, causes the second RCN to perform operations to:
when the radio connection of the UE, served in the first beam controlled by the first RCN, has been established in the second beam controlled by the second RCN, obtain measurements relating to information about characteristics of the radio connection of the UE to a second radio node providing the second beam and controlled by the second RCN, the measurements resulting to information about characteristics of the radio connection of the UE resulting from measurements performed by the UE in the second beam after the radio connection has been established between the UE and the second radio node; and
send feedback to the first RCN, which feedback relates to the information about the characteristics of the radio connection in the second beam based on the obtained measurements by the UE, together with measurement information obtained at the second RCN, thereby, assisting the first RCN to determine a coverage overlap of the first beam and the second beam, in order for the first RCN to use the coverage overlap to consider transfer of another UE, at a later time, served in the first beam controlled by the first RCN to the second beam and under control of the second RCN.

18. The second RCN according to claim 17, wherein the computer program code further causes the second RCN to:
arrange for the establishment of the radio connection of the UE in the second beam controlled by the second RCN.

19. The second RCN according to claim 17, wherein the measurements relating to information about the characteristics of the radio connection in the second beam resulting from measurements performed when the radio connection has been established between the UE and a second radio node providing the second beam are obtained by:
received measurement results from the UE, and the measurement information obtained at the second RCN is performed by the second radio node providing the second beam.

20. The second RCN according to claim 17, wherein the feedback comprises any one or more out of:
reference signal received power,
reference signal received quality,
radio channel transmission bandwidth,
radio interference characteristics,
radio link margins for beamforming,
radio link margins for power,
radio node internal data transmission delay,
rank indication,
channel-quality indication,
energy consumption, and
time between RLF and re-connection.

21. The second RCN according to claim 17, wherein the establishment of the radio connection in the second beam is due to any one out of: a handover decision, a radio link failure, and decision on an additional radio connection.

22. A User Equipment (UE) for assisting a first Radio Control Node RCN to provide for a radio connection to be established in a second beam controlled by a second RCN for the UE served in a first beam controlled by the first RCN, the UE comprising:
  a processor; and
  a memory comprising computer program code which, when executed by the processor, causes the UE to perform operations to:
  send to the first RCN, information about expected characteristics of the second beam based on measurements performed by the UE when the UE is connected to the first radio node providing the first beam controlled by the first RCN;
  when the expected characteristics of the second beam fulfill one or more criteria, establish the radio connection of the UE to a second radio node providing the second beam and controlled by the second RCN; and
  when the radio connection of the UE, served in the first beam controlled by the first RCN, has been established in the second beam controlled by the second RCN, obtain measurements relating to information about the characteristics of the radio connection of the UE in the second beam resulting from measurements performed by the UE in the second beam after the radio connection has been established between the UE and the second radio node; and
  send feedback to the second RCN, which feedback relates to information about the characteristics of the radio connection in the second beam based on the obtained measurements performed by the UE in the second beam, wherein the second RCN sends the feedback, together with measurement information obtained at the second RCN, to the first RCN, thereby assisting the first RCN to determine a coverage overlap of the first beam and the second beam, in order for the first RCN to use the coverage overlap to consider transfer of another UE at a later time, served in the first beam controlled by the first RCN to the second beam and under control of the second RCN.

23. The UE according to claim 22, wherein the feedback comprises any one or more out of:
  reference signal received power,
  reference signal received quality,
  radio interference characteristics,
  radio link margins for beamforming,
  radio link margins for power,
  rank indication,
  channel-quality indication,
  energy consumption, and
  time between RLF and re-connection.

24. The UE according to claim 22, wherein the establishment of the radio connection in the second beam is due to any one out of: a handover decision, a radio link failure, and decision on an additional radio connection.

\* \* \* \* \*